Dec. 25, 1962    P. L. FRANCIS    3,070,364
VACUUM SPRING CONSTRUCTION
Filed Oct. 14, 1960
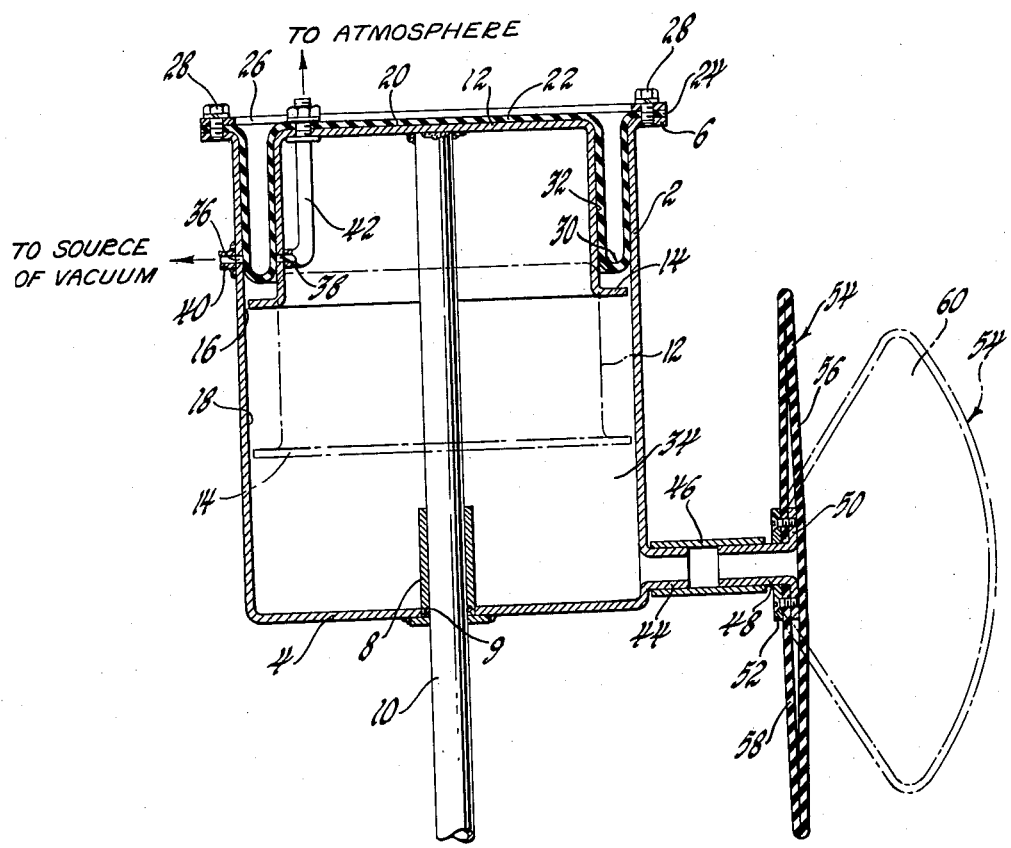
INVENTOR.
Philip L. Francis
BY W. F. Wagner
ATTORNEY

United States Patent Office 3,070,364
Patented Dec. 25, 1962

3,070,364
VACUUM SPRING CONSTRUCTION
Philip L. Francis, Pontiac, Mich., assignor to General Motors Corporation, Detroit, Mich., a corporation of Delaware
Filed Oct. 14, 1960, Ser. No. 62,629
7 Claims. (Cl. 267—65)

This invention relates to vehicle suspension and more particularly to vacuum energized springs therefor.

An object of the invention is to provide an improved vehicle suspension spring.

Another object is to provide an improved vacuum energized spring.

A further object is to provide a vacuum spring incorporating means for preventing the formation of superatmospheric pressure therein as a result of excessive rebound movement of the spring.

A still further object is to provide in a piston, cylinder and diaphragm type vacuum spring, means to prevent buckling of the diaphragm under conditions wherein maximum piston rebound movement would normally tend to create a slight superatmospheric pressure within the spring.

Yet a further object is to provide a device for the stated character which does not alter the normal volumetric capacity of the spring under normal conditions of operation.

Still a further object is to provide a piston, cylinder, and diaphragm type spring adapted to contain varying levels of subatmospheric pressure, wherein the cylinder is connected in communicating relation with a flexible bladder which is adapted to expand whenever rebound movement of the spring produces pressures therein which equal or exceed atmospheric pressure.

Still another object is to provide a structure of the stated character wherein the bladder and connection thereof with the spring cylinder is constructed and arranged so that under conditions of subatmospheric pressure within the spring, only a very small area of the bladder is subjected directly to the subatmospheric pressure therein.

These and other objects, advantages, and features of the invention will become more fully apparent as reference is had to the accompanying specification and drawing.

The single FIGURE of the drawing is a fragmentary side elevational view in section of a vacuum spring incorporating the invention.

In the drawing, the reference numeral 2 designates generally an upright cup-shaped cylinder having a closed bottom wall 4 and an open upper end bounded by a radially outwardly directed flange 6. Centrally of its bottom wall 4, cylinder 2 is provided with a sleeve 8 which is rigidly attached to bottom wall 4, as by welding. Extending upwardly through sleeve 8 and embraced by an O-ring seal 9 carried therein is a piston rod 10, the upper end of which is secured as by welding to an inverted cup-shaped piston 12 having a radially outwardly directed flange 14 at its lower end. Flange 14 is dimensioned so as to provide a very small annular clearance 16 between its peripheral edge and the inner wall 18 of cylinder 2, the purpose of which will be explained subsequently.

Overlying the top wall 20 of piston 12 is a thin flexible diaphragm 22, the outer peripheral edge 24 of which is secured between cylinder flange 6 and a cooperating clamping ring 26 by bolts 28. An intermediate portion of diaphragm 22 forms a single depending convolution 30 which extends downwardly between and embraces the inner wall 18 of cylinder 2 and the outer wall 32 of piston 12.

Cylinder 2 and piston rod 10 are intended for connection to the sprung and unsprung mass, respectively, of a vehicle, not shown. To provide for the control of the level of subatmospheric pressure within the cavity 34 defined by cylinder 2, piston 12 and diaphragm 22 in accordance with variation in the sprung load, a pair of ports 36 and 38, respectively, are formed in the side walls of cylinder 2 and piston 12. Ports 36 and 38 are located so as to be in horizontal alignment when the piston 12 is in a predetermined normal vertical displacement relative to cylinder 2 wherein the lower portion of convolution 30 simultaneously overlaps both ports, which predetermined displacement maintains the sprung mass at the desired level above the unsprung mass. Port 36 communicates with a suitable source of vacuum, not shown, by means of a conduit 40 while port 38 communicates with atmosphere via an L-shaped conduit 42 which extends upwardly through the top wall of piston 12 and diaphragm 22.

It will be apparent that upward displacement of piston 12 will cause the diaphragm to progressively peel off the cylinder wall and onto the piston wall until port 36 is uncovered placing the cavity 34 in communication with the source of vacuum. Conversely, downward displacement of piston 12 will cause the diaphragm to peel away from the piston wall onto the cylinder wall until port 38 is uncovered allowing communication between cavity 34 and atmosphere. Consequently, the level of subatmospheric pressure within cavity 34 is a direct function of piston displacement which automatically varies in accordance with the load imposed on the spring.

In springs of the type described, it will be evident that under conditions of very light loading, the level of subatmospheric pressure in cavity 34 may be very low; that is, very closely approach atmospheric pressure. Under such circumstances, severe rebound deflection of piston 12, for example, to the position shown in dotted lines, could raise the slight subatmospheric pressure to atmospheric pressure or slightly above, which would tend to exert an upward force on the depending convolution 30 of the diaphragm 22 causing the latter to buckle or possibly to wedge in the annular interval between the piston and the cylinder. To overcome this possibility in accordance with one feature of the invention, the piston flange 14 is dimensioned, as previously mentioned, so as to closely approach the inside diameter of the cylinder. This small clearance acts as an annular restriction orifice which prevents pressure increase resulting from piston rebound deflection from being transmitted quickly to the volumetric area between flange 14 and convolution 30.

To further assure freedom from transient superatmospheric conditions, in accordance with another feature of the invention the cylinder 2 is provided with a relatively large diameter nipple 44 which has attached thereto a coupling 46. Coupling 46, in turn, is connected to a fitting 48 having an outer end formed with a radially outwardly directed flange 50. Clamped between flange 50 and cooperating ring 52 is the apertured mouth of a flexible bladder 54. Bladder 54 is preferably molded so that in free form it assumes the disk-like folded configuration shown in solid lines. The imperforate outer surface 56 of bladder 54 normally lies in flush relation with the apertured inner surface 58. Therefore, only the relatively small diameter of surface 56 adjacent the mouth of flange 50 is subjected to the subatmospheric pressure normally contained within cavity 34. However, under the conditions previously defined wherein slight superatmospheric pressure is created within the cavity 34 by excessive piston rebound movement, the entire interior 60 of bladder 54 is opened to communication with cavity 34 as the small central area of surface 56 moves away from flange 50. Therefore, the degree of rebound movement of piston 22 which may occur before a positive or superatmospheric pressure is created within cavity 34, is greatly extended.

By proper proportioning the volumetric capacity of bladder 54, the possibility of superatmospheric pressure being created in the spring may be virtually eliminated and thus overcome the possibility of buckling of the diaphragm 22.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. A vacuum spring comprising, a cylinder and piston arranged in loosely telescoping relation, a diaphragm connecting said piston and cylinder, and a flexible hollow body connected in communicating relation with the interior of said cylinder, said hollow body including a portion acting as a check valve preventing communication between the interior of said hollow body and the interior of said cylinder when the pressure in the latter is subatmospheric.

2. A vacuum spring comprising, a cylinder and piston arranged in loosely telescoping relation, a diaphragm connecting said piston and cylinder, a tubular portion connected in communicating relation with said cylinder, and a flexible bladder connected in communicating relation with said tubular portion, said bladder including normally abutting circular portions, one of which normally abuttingly engages one end of said tubular portion thereby acting as a check valve preventing communication between the interior of said hollow body and the interior of said cylinder when the pressure in the latter is subatmospheric.

3. In combination, an upright-cup shaped cylinder having a sleeve formed in the bottom wall thereof, a piston rod slidably disposed in said sleeve, an inverted cup-shaped piston attached at the upper end of said rod in concentric relation with said cylinder, said piston having a depending annular wall of a diameter substantially less than the diameter of said cylinder, a diaphragm connecting the top of said cylinder and piston, said diaphragm including a depending single convolution intermediate annular portion overlapping the opposed wall portions of said piston and cylinder, a tubular member connected at one end in communication with said cylinder, means forming a flange at the other end of said tubular member, and a flexible bladder connected to said flange, said bladder being normally folded so that a portion thereof overlies the mouth of said flange in sealing engagement therewith.

4. In combination, an upright cup-shaped cylinder having a sleeve formed in the bottom wall thereof, a piston rod slidably disposed in said sleeve, an inverted cup-shaped piston attached at the upper end of said rod in concentric relation with said cylinder, said piston having a depending annular wall of a diameter substantially less than the diameter of said cylinder, a flange on the lower end of said annular wall substantially reducing the clearance between said piston and cylinder, a diaphragm connecting the top of said cylinder and piston, said diaphragm including a depending single convolution intermediate annular portion overlapping the opposed wall portions of said piston and cylinder, a tubular member connected at one end in communication with said cylinder, means forming a flange at the other end of said tubular member, and a flexible bladder connected to said flange, said bladder being normally folded so that a portion thereof overlies the mouth of said flange in sealing engagement therewith.

5. In combination, an upright cup-shaped cylinder having a sleeve formed in the bottom wall thereof, a piston rod slidably disposed in said sleeve, an inverted cup-shaped piston attached at the upper end of said rod in concentric relation with said cylinder, said piston having a depending annular wall of a diameter substantially less than the diameter of said cylinder, a flange on the lower end of said annular wall substantially reducing the clearance between said piston and cylinder, a diaphragm connecting the top of said cylinder and piston, said diaphragm including a depending single convolution intermediate annular piston overlapping the opposed wall portions of said piston and cylinder, a tubular member connected at one end in communication with said cylinder, means forming a flange at the other end of said tubular member, and a flexible bladder connected to said flange, said bladder having a front surface formed with an aperture surrounding said tubular member and an imperforate rear surface normally abutting said flange responsive to subatmospheric pressure in said cylinder.

6. The structure set forth in claim 5 wherein the apertured front surface of said bladder is positively secured in abutting relation with one side of said flange and the imperforate surface engages the other side of said flange.

7. The structure set forth in claim 6 wherein said bladder comprises a molded rubber body having peripherally sealed circular front and rear walls which in free form lie in abutting relation.

References Cited in the file of this patent
UNITED STATES PATENTS

| 1,111,739 | Davis | Sept. 29, 1914 |
| 2,882,042 | Fleckenstein | Apr. 14, 1959 |

FOREIGN PATENTS

| 546,776 | Great Britain | July 29, 1942 |